(12) United States Patent
Nada

(10) Patent No.: US 10,605,679 B2
(45) Date of Patent: Mar. 31, 2020

(54) PRESSURE SENSOR

(71) Applicant: Nissha Co., Ltd., Kyoto-shi, Kyoto (JP)

(72) Inventor: Hideaki Nada, Kyoto (JP)

(73) Assignee: NISSHA CO., LTD., Kyoto-Shi, Kyoto (JP)

( * ) Notice: Subject to any disclaimer, the term of this patent is extended or adjusted under 35 U.S.C. 154(b) by 0 days.

(21) Appl. No.: 16/336,379

(22) PCT Filed: Aug. 29, 2017

(86) PCT No.: PCT/JP2017/030919
§ 371 (c)(1),
(2) Date: Mar. 25, 2019

(87) PCT Pub. No.: WO2018/070123
PCT Pub. Date: Apr. 19, 2018

(65) Prior Publication Data
US 2019/0219461 A1   Jul. 18, 2019

(30) Foreign Application Priority Data

Oct. 13, 2016   (JP) ................................. 2016-201574

(51) Int. Cl.
*G01L 1/00*   (2006.01)
*G01L 5/00*   (2006.01)
(Continued)

(52) U.S. Cl.
CPC ............... *G01L 1/20* (2013.01); *G01L 1/205* (2013.01); *G01L 1/2293* (2013.01); *G01L 5/0028* (2013.01)

(58) Field of Classification Search
CPC ......... G01L 1/20; G01L 1/205; G01L 1/2293; G01L 5/0028
(Continued)

(56) References Cited

U.S. PATENT DOCUMENTS 9,552,092 B2 * 1/2017 Seo ...................... G02F 1/13394
2003/0024113 A1 * 2/2003 Scher ...................... G01L 1/205
29/840
(Continued)

FOREIGN PATENT DOCUMENTS

JP    11-083644 A    3/1999
JP    2014-035227 A  2/2014
(Continued)

OTHER PUBLICATIONS

International Search Report for International Application No. PCT/JP2017/030919, dated Nov. 28, 2017, 2 pp.

*Primary Examiner* — Max H Noori
(74) *Attorney, Agent, or Firm* — United IP Counselors, LLC

(57) ABSTRACT

A pressure sensor is disclosed. The pressure sensor includes a common electrode, sensitized electrodes, mountain-shaped pressure-sensitive layers, and thin-film transistors. The common electrode is formed as a layer. The sensitized electrodes are arranged in a matrix opposing the common electrode. The mountain-shaped pressure-sensitive layers are respectively formed over the sensitized electrodes on a side close to the common electrode. The thin-film transistors are disposed to correspond to the sensitized electrodes on sides of the sensitized electrodes opposite to the common electrode. A distance between the sensitized electrodes and an outer edge of a contact surface at which the common electrode and the mountain-shaped pressure-sensitive layers contact gradually becomes narrower when, due to pressing force applied to the common electrode toward the mountain-shaped pressure-sensitive layers and the sensitized electrodes, the contact surface expands outward from central portions of the mountain-shaped pressure-sensitive layers when viewed in plan.

6 Claims, 17 Drawing Sheets

(51) Int. Cl.
*G01L 1/20* (2006.01)
*G01L 1/22* (2006.01)

(58) Field of Classification Search
USPC .......................................... 73/862.68
See application file for complete search history.

(56) References Cited

U.S. PATENT DOCUMENTS

| | | | |
|---|---|---|---|
| 2005/0104089 A1* | 5/2005 | Engelmann | H04N 5/3651 257/204 |
| 2005/0241409 A1* | 11/2005 | Taylor | A61B 5/103 73/841 |
| 2006/0110878 A1* | 5/2006 | Lung | H01L 27/112 438/253 |
| 2012/0256720 A1 | 10/2012 | Byun et al. | |
| 2012/0319966 A1* | 12/2012 | Reynolds | G06F 3/041 345/173 |
| 2015/0168788 A1* | 6/2015 | Song | G02F 1/134309 345/174 |
| 2016/0291748 A1* | 10/2016 | Wang | G06F 3/0412 |
| 2019/0234818 A1* | 8/2019 | Nada | G01L 5/0052 |

FOREIGN PATENT DOCUMENTS

| | | |
|---|---|---|
| JP | 2015-114308 A | 6/2015 |
| JP | 2016-004940 A | 1/2016 |
| KR | 10-2012-0114961 A | 10/2012 |

\* cited by examiner

PRESSURE SENSOR

CROSS-REFERENCE TO RELATED APPLICATIONS

This application is the U.S. National Phase of PCT International Application No. PCT/JP2017/030919, filed on Aug. 29, 2017. That application claims priority to Japanese Patent Application No. 2016-201574, filed Oct. 13, 2016. The contents of that application are incorporated by reference herein in their entirety.

TECHNICAL FIELD

The present disclosure relates to a pressure sensor, more particularly to a pressure sensor that includes a pressure-sensitive layer and a plurality of thin-film transistors that function as electrodes.

BACKGROUND ART

There is known a pressure sensor that is formed through combining a plurality of thin-film transistors and a pressure-sensitive resin (see, for example, Japanese Patent Application Publication 2016-4940).

The pressure-sensitive resin is a resin formed by dispersing conductive particles in an insulating resin such as silicon rubber. When pressure is applied to the pressure-sensitive resin, conductive particles in the insulating resin make contact with each other and hence the resistance value of the pressure-sensitive resin decreases. As a result, it is possible to detect pressure that is applied to the pressure-sensitive resin.

The plurality of thin-film transistors are arranged in a matrix and function as electrodes. With this configuration, pressure can be detected at a higher speed and a higher resolution, and power can be saved.

BRIEF SUMMARY

There is also known a pressure sensor in which a pressure-sensitive layer and a plurality of electrodes are arranged facing each other with a predetermined gap between the pressure-sensitive layer and the electrodes.

Generally speaking, pressure sensors that detect pressure based on a change in the contact area of the pressure-sensitive layer have a small range for measuring pressure, which is a problem. More specifically, pressure-electricity resistance characteristics undergo a large rate of change in electrical resistance in a low-pressure range and a low rate of change in a high-pressure range. This is because, even if pressure increases, the area of contact between the pressure-sensitive layer and the electrodes does not increase partway through contact. In other words, contact resistance is not responsive to pressure. As a result, sensitivity is insufficient, and pressure cannot be accurately measured in a high-pressure range.

It is an object of the present disclosure to provide a pressure sensor that includes a plurality of electrodes arranged with gaps between the electrodes and that has a larger pressure measurement range in which pressure can be accurately measured.

Means for solving the problem of the disclosure are described below in the form of aspects. The below aspects can be freely combined as required.

A pressure sensor according to one aspect of the present disclosure includes a common electrode, a plurality of sensitized electrodes, a plurality of mountain-shaped pressure-sensitive layers, and a plurality of thin-film transistors.

The common electrode is spread out over one surface.

The plurality of sensitized electrodes are arranged in a matrix opposing the common electrode.

The plurality of mountain-shaped pressure-sensitive layers are respectively formed over the plurality of sensitized electrodes on a side close to the common electrode.

The plurality of thin-film transistors are disposed so as to correspond to the plurality of sensitized electrodes on sides of the sensitized electrodes opposite to the common electrode, where one or two or more adjacent thin-film transistors are connected to one sensitized electrode.

The distance between the sensitized electrodes and an outer edge of a contact surface at which the common electrode and the mountain-shaped pressure-sensitive layers make contact gradually becomes narrower when, due to pressing force being applied to the common electrode toward the mountain-shaped pressure-sensitive layers and the sensitized electrodes, the contact surface expands outward from central portions of the mountain-shaped pressure-sensitive layers when viewed in plan.

Note that the term "mountain-shaped" includes a dome shape, a conical shape and a frustum shape that has an apex (or a central portion) and a peripheral edge portion. The mountain-shape can have a circular planar shape, a square planar shape or another planar shape.

In addition, the term "outward" refers to a direction separating from the central portion of the mountain-shaped pressure-sensitive layer when viewed in plan.

Because this pressure sensor includes the mountain-shaped pressure-sensitive layers, the area of contact between the common electrode and the mountain-shaped pressure-sensitive layers gradually increases when pressure acts on the pressure sensor. As a result, the range for measuring pressure increases.

In addition, when high pressure acts on the pressure sensor, an outer edge of the contact surface at which the common electrode and the mountain-shaped pressure-sensitive layers make contact is located further outward than when low pressure acts on the pressure sensor. In this state, the distance between the sensitized electrodes and the outer edges of the contact surfaces narrows and short conduction paths are secured between the common electrode and the sensitized electrodes. Therefore, even in a high-pressure range where the contact area changes less, sensitivity is high and pressure can be accurately measured. In other words, in the pressure sensor, a wide pressure measurement range in which pressure can be accurately measured can be secured.

Pressure can also be accurately measured in a low-pressure range because the areas of the apex portions of the mountain-shaped pressure-sensitive layers are smaller.

The sensitized electrode can have a diameter that is 30% or more the length of the diameter of the mountain-shaped pressure-sensitive layer. In this case, the above-described effect can be reliably obtained.

Note that the sensitized electrode can have a circular or other shaped planar shape, and hence the term "diameter" herein refers to the length of the sensitized electrode from a central portion to each edge of the sensitized electrode when viewed in plan.

The sensitized electrode can have a diameter that is 50% or more the length of the diameter of the mountain-shaped pressure-sensitive layer. In this case, the above-described effect can be obtained more reliably.

The sensitized electrode can have a diameter that extends to the vicinity of an outer edge of a contact surface at which the common electrode and the mountain-shaped pressure-sensitive layers can make contact with each other with a largest area. In this case, the above-described effect can be obtained more reliably.

The sensitized electrode can be completely covered by the mountain-shaped pressure-sensitive layer.

In this pressure sensor, the sensitized electrode does not protrude further than the mountain-shaped pressure-sensitive layer, and hence the common electrode and the sensitized electrode are less likely to make contact.

The pressure sensor can further include an insulating substrate disposed on the common electrode on a side opposite to the plurality of sensitized electrodes.

The insulating substrate and the common electrode can be elastic.

In this pressure sensor, the insulating substrate and the common electrode are elastic. Therefore, the common electrode is more likely to make contact with the outer peripheral sides of the mountain-shaped pressure-sensitive layers when pressure acts on the pressure sensor. Therefore, the resolution of pressure increases. In addition, repeated accurate measurement is possible because the elastic insulating substrate and common electrode return to their original shape when pressure is alleviated.

The pressure sensor according to the present disclosure has a larger pressure measurement range in which pressure can be accurately measured.

DETAILED DESCRIPTION

1. First Embodiment (1) Basic Configuration of Pressure Sensor

Figure 1:
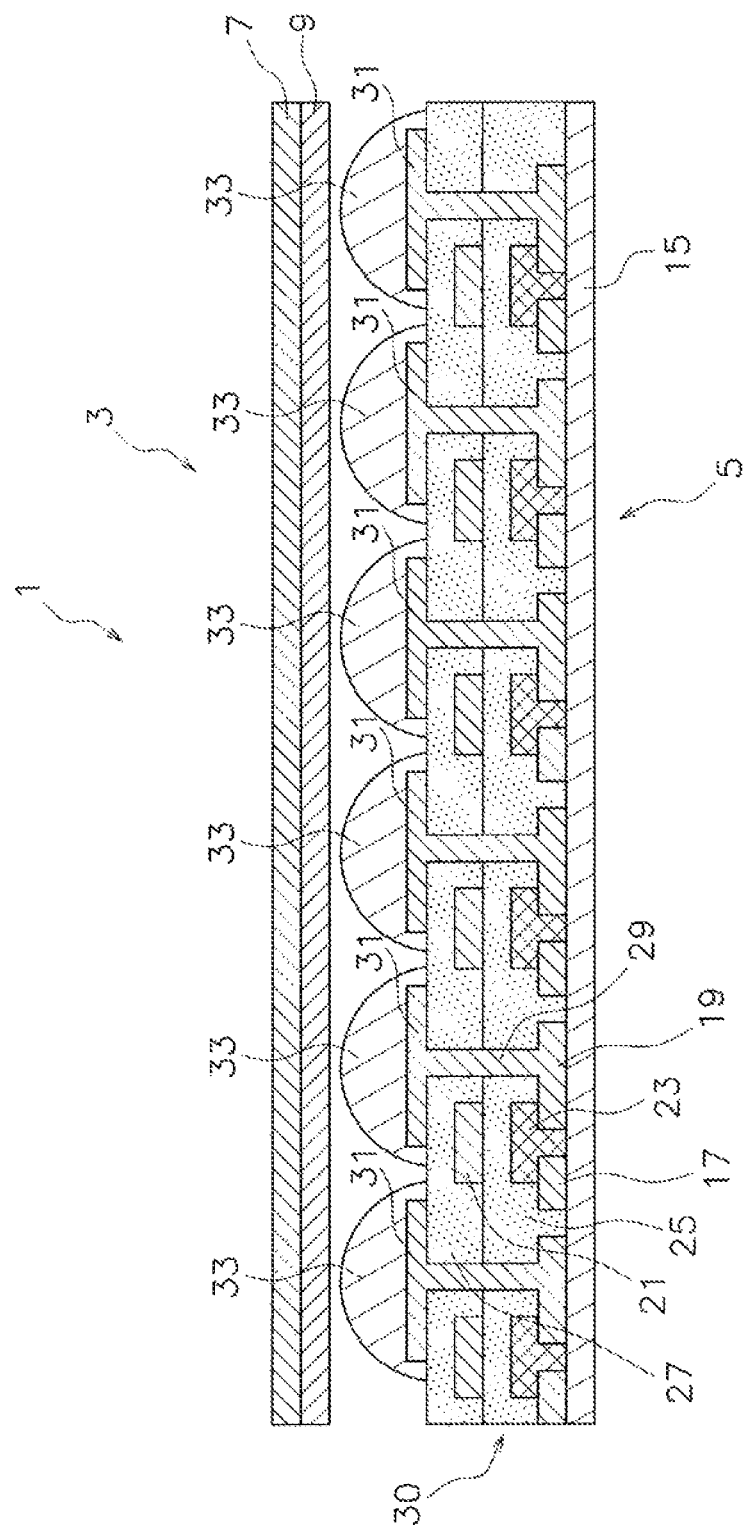
FIG. 1 is a schematic cross-sectional view of a pressure sensor according to a first embodiment of the present disclosure.
Figure 2:
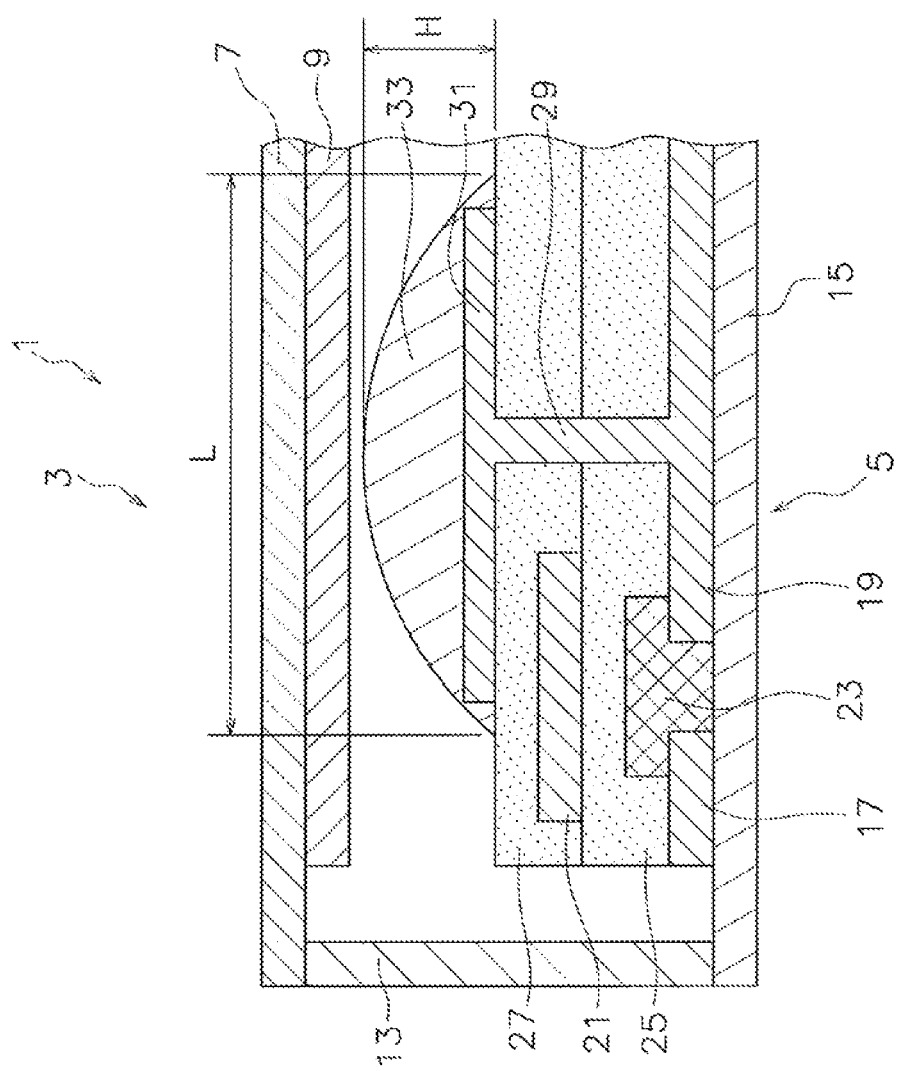
FIG. 2 is a partial schematic cross-sectional view of the pressure sensor.
Figure 3:
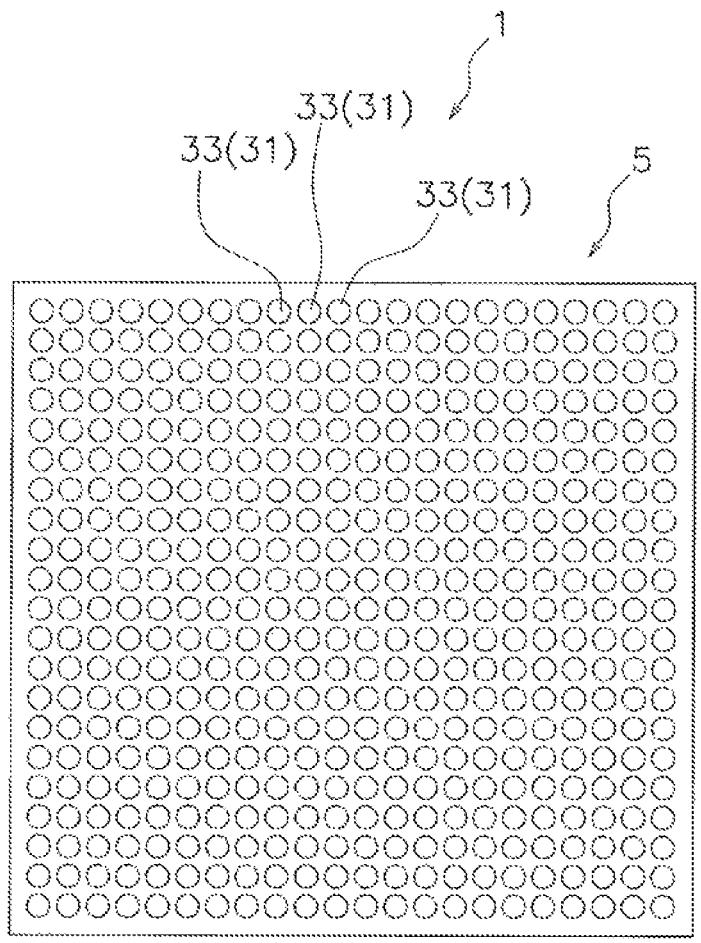
FIG. 3 is a schematic plan view of a lower electrode member in the pressure sensor.
Figure 4:
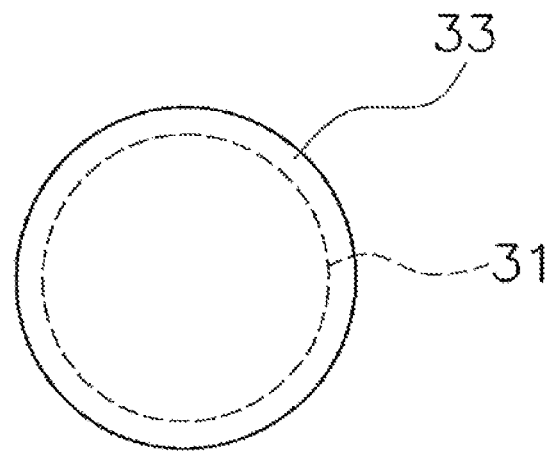
FIG. 4 is a schematic plan view of a sensitized electrode and a pressure-sensitive layer.
Figure 5:
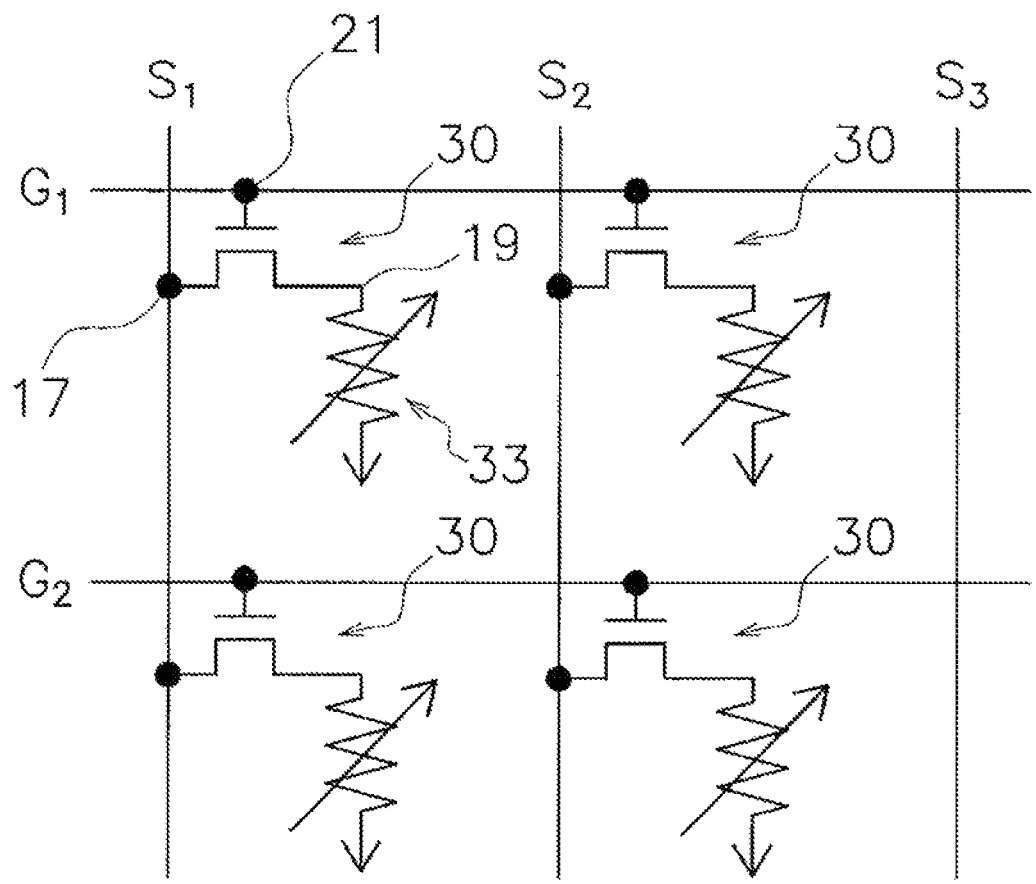
FIG. 5 is an equivalent circuit diagram of the pressure sensor.

A pressure sensor 1 according to a first embodiment is described with reference to FIGS. 1 to 5. FIG. 1 is a schematic cross-sectional view of a pressure sensor according to the first embodiment of the present disclosure. FIG. 2 is a partial schematic cross-sectional view of the pressure sensor. FIG. 3 is a schematic plan view of a lower electrode member of the pressure sensor. FIG. 4 is a schematic plan view of a sensitized electrode and a pressure-sensitive layer. FIG. 5 is an equivalent circuit diagram of the pressure sensor.

The pressure sensor 1 is a device that detects a pressed position and pressing force when pressing force acts on the pressure sensor 1. The pressure sensor 1 is used in the touch screen of, for example, a smartphone, a tablet PC or a note PC.

The pressure sensor 1 includes an upper electrode member 3. The upper electrode member 3 is a planar member on which pressing force acts. The upper electrode member 3 includes an insulating film 7 and a common electrode 9 that is formed on the entire lower surface of the upper electrode member 3. In other words, the common electrode 9 is spread out or patterned on one surface of the upper electrode member 3.

The pressure sensor 1 includes a lower electrode member 5. The lower electrode member 5 is a planar member arranged below the upper electrode member 3. The lower electrode member 5 includes, for example, a rectangular insulating film 15 and a plurality of sensitized electrodes 31 that are located on an upper surface of the insulating film 15. The sensitized electrodes are also referred to as individual electrodes or pixel electrodes.

The lower electrode member 5 includes a plurality of mountain-shaped pressure-sensitive layers 33. One mountain-shaped pressure-sensitive layer 33 is formed over each sensitized electrode 31 on the side of the sensitized electrode 31 that faces the common electrode 9. To provide a schematic description, as illustrated in FIGS. 2 and 4, the mountain-shaped pressure-sensitive layer 33 entirely covers the sensitized electrode 31 and has an outer diameter that is slightly larger than the outer diameter of the sensitized electrode 31. Because of this, the sensitized electrodes 31 are hidden by the mountain-shaped pressure-sensitive layers 33 when viewed in plan.

Note that the term "mountain-shaped" includes a dome shape, a conical shape and a frustum shape that has an apex (or a central portion) and a peripheral edge portion. The mountain-shape can have a round planar shape, a square planar shape or another planar shape.

Because the pressure-sensitive layer 33 is formed into a mountain shape, the area of contact between the common electrode 9 and the mountain-shaped pressure-sensitive layer 33 increases according to how much pressure is applied. The thickness and resistance value of the mountain-shaped pressure-sensitive layer 33 decrease closer to the outer periphery of the mountain-shaped pressure-sensitive layer 33. In other words, when pressure is low, only the apex (center in the radial direction) of the mountain-shaped pressure-sensitive layer 33 makes contact with the common electrode 9 with a small area of contact. When pressure is high, the common electrode 9 makes contact with the mountain-shaped pressure-sensitive layer 33 until halfway down the mountain shape (middle portion in the radial direction) or until the base of the mountain shape (outer peripheral portion) with a large area of contact.

As one example, the mountain-shaped pressure-sensitive layer 33 has a height H of between 5 μm and 100 μm in a wide range and between 10 μm to 30 μm in a narrow range. The diameter L of the mountain-shaped pressure-sensitive layer 33 is between 0.1 mm and 1.0 mm in a wide range and between 0.3 mm and 0.6 mm in a narrow range.

Because the mountain-shaped pressure-sensitive layer 33 is formed such that the outer diameter of the sensitized electrode 31 extends to a point just short of the outer diameter of the mountain-shaped pressure-sensitive layer 33, the following effects are achieved. When pressure is low, a conduction path (shortest distance between the common electrode 9 and the sensitized electrode 31 through the mountain-shaped pressure-sensitive layer 33) of the mountain-shaped pressure-sensitive layer 33 is long and the resistance value of the mountain-shaped pressure-sensitive layer 33 is high. When pressure is high, the conduction path of the mountain-shaped pressure-sensitive layer 33 is short and the resistance value of the mountain-shaped pressure-sensitive layer 33 is low. In the present embodiment, the sensitized electrode 31 and the mountain-shaped pressure-sensitive layer 33 both have a circular planar shape. Therefore, the narrow portion of the conduction path expands in a circular shape when viewed in plan from the center to the outer peripheral side of the conduction path. In other words, each circular circumferential portion of the sensitized electrode 31 is a sensitized portion that extends radially outward from the center of the sensitized electrode 31.

As illustrated in FIG. 2, the upper electrode member 3 and the lower electrode member 5 are joined to each other at peripheral edges using a frame spacer 13. The frame spacer 13 is formed into a frame shape and is made of, for example, an adhesive or double-sided tape.

As illustrated in FIG. 3, the plurality of sensitized electrodes 31 and mountain-shaped pressure-sensitive layers 33 are arrayed in a matrix laid out on a flat plane. A "matrix" refers to a state where the plurality of sensitized electrodes 31 and mountain-shaped pressure-sensitive layers 33 are two-dimensionally arranged in rows and columns. As illustrated in FIGS. 1 and 2, the frame spacer 13 ensures that there is a gap between the common electrode 9 and the mountain-shaped pressure-sensitive layer 33 even in an initial state. As a result, zero pressure can be reliably measured. In addition, zero pressure can be reliably measured even after initial resistance has changed because measurement is started when the contact area is zero. However, the common electrode 9 and the mountain-shaped pressure-sensitive layer 33 can be in contact in the initial state.

When a region of the common electrode 9 is pushed down toward the mountain-shaped pressure-sensitive layers 33, the common electrode 9 and the sensitized electrode 31 located in the pushed down area become electrically conducive with each other. The common electrode 9 can be pushed down using a finger, a stylus pen, a stick, the palm of a hand, or a foot. The pitch between electrodes is, for example, between 0.3 mm and 0.7 mm.

The lower electrode member 5 includes a plurality of thin-film transistors 30 (hereinafter referred to as "TFT 30"). One TFT 30 is located to correspond with one sensitized electrode 31. Each TFT 30 functions as an electrode for detecting current value.

(2) Relationship Between TFT and Sensitized Electrode

As illustrated in FIGS. 1 and 2, one TFT 30 includes a source electrode 17, a drain electrode 19 and a gate electrode 21. The TFT 30 is a top gate transistor. The materials used to form the gate electrode, the source electrode and the drain electrode are not particularly limited. The TFT can be a bottom gate transistor.

The source electrode 17 and the drain electrode 19 are formed on an upper surface of the insulation film 15. The TFT 30 also includes an organic semiconductor 23 that is formed between the source electrode 17 and the drain electrode 19. The material used to form the semiconductor layer can be a known material such as silicon, an oxide semiconductor, or an organic semiconductor.

The TFT 30 includes a first insulation film 25 formed so as to surround the source electrode 17, the drain electrode 19 and the organic semiconductor 23.

As described later, the drain electrode 19 is connected to the sensitized electrode 31. The gate electrode 21 is formed on an upper surface of the first insulation film 25 above the organic semiconductor 23.

The TFT 30 includes a second insulation film 27 that is formed on the upper surface of the first insulation film 25 and that covers the gate electrode 21.

The plurality of sensitized electrodes 31 are formed on an upper surface of the second insulation film 27. A sensitized electrode is connected to a TFT 30 through a conductive portion 29 that is formed in a through hole that penetrates the first insulation film 25 and the second insulation film 27.

The principle of operation behind the pressure sensor 1 is described with reference to FIG. 5. When a gate voltage is input to the TFT 30 and voltage is applied to the drain electrode 19 of the TFT 30, drain current flows. This drain current corresponds to resistance of the mountain-shaped pressure-sensitive layer 33. Resistance decreases when the pressure applied to the mountain-shaped pressure-sensitive layer 33 increases. Therefore, an increase in drain current is detected. Pressure distribution on the front surface of the sheet can be observed by sweeping the TFT 30 on the pressure sensor 1, applying a gate voltage and measuring the drain current.

The pressure sensor 1 includes a circuit unit (not shown). The circuit unit controls the drain electrode 19, the source electrode 17 and the common electrode 9 and includes, for example, a current detection circuit that generates a power source voltage that applies predetermined voltage to the common electrode 9 and the source electrode 17, and a signal that corresponds to the current value between the source and the drain. The circuit unit outputs the power source voltage and the signal to an external signal processing device. The external signal processing device detects the pressed position and the pressing force on the basis of the signal sent from the circuit unit.

(3) Pressing Operation and Pressure Measurement Operation

Figure 6:
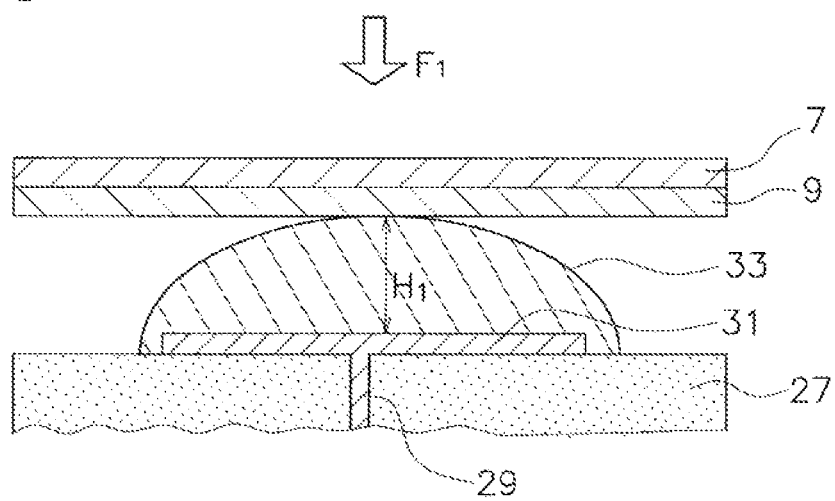
FIG. 6 is a schematic cross-sectional view of the pressure sensor under a state where pressure is applied.
Figure 7:
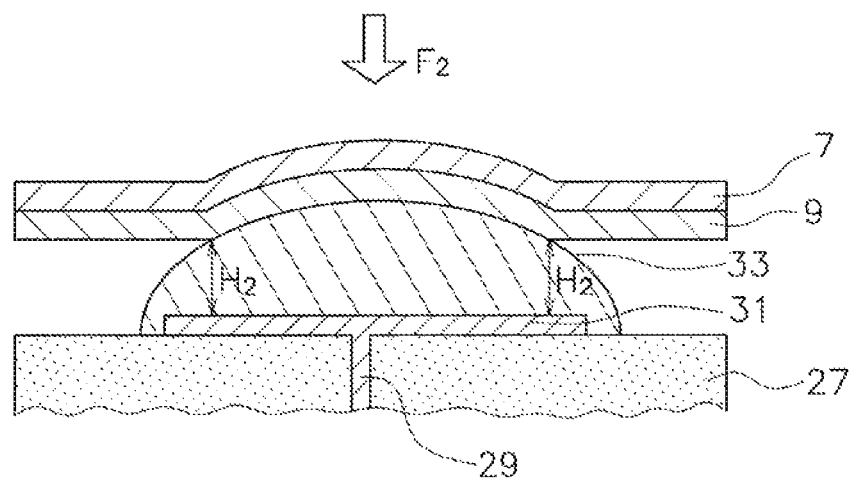
FIG. 7 is a schematic cross-sectional view of the pressure sensor under a state where pressure is applied.
Figure 8:
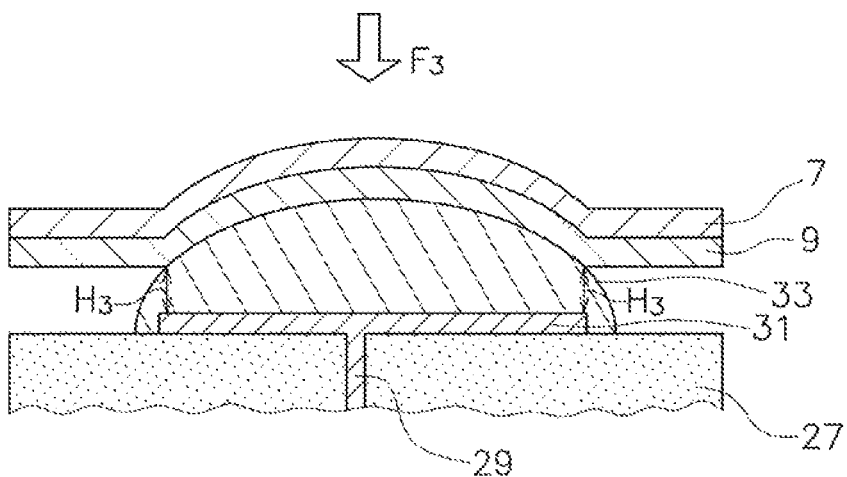
FIG. 8 is a schematic cross-sectional view of the pressure sensor under a state where pressure is applied.
Figure 9:
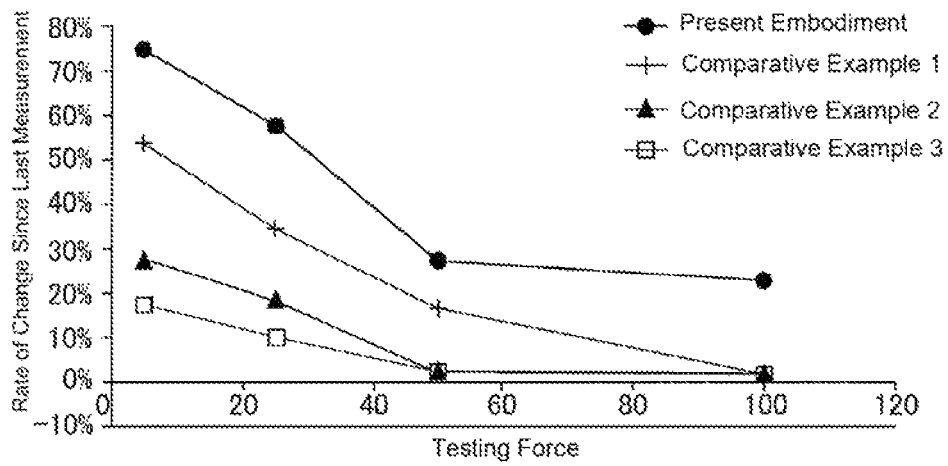
FIG. 9 is a graph showing the relationship between pressure and a rate of change of electrical resistance in the pressure sensor.

A pressing operation and pressure measurement operation are described with reference to FIGS. 6 to 9. FIGS. 6 to 8 are schematic cross-sectional views of the pressure sensor under a state where pressure is applied. FIG. 9 is a graph showing the relationship between pressure and a rate of change of electrical resistance in the pressure sensor.

When pressure is applied, resistance of the mountain-shaped pressure-sensitive layer 33 decreases. The difference in potential between the source and the drain when a constant voltage is applied by the voltage power supply is dependent on the resistance value of the mountain-shaped pressure-sensitive layer 33 that is connected in series to the drain electrode 19. As a result, the difference in potential between the source and the drain increases and the amount of flowing current also increases. Because of this, if the pressing force and amount of current applied to the mountain-shaped pressure-sensitive layer 33 are acquired in advance, the amount of pressure (pressing force) applied to the pressure sensor 1 can be detected through a signal processing device (not shown) reading a signal changes according to current amount.

In FIG. 6, a small force F1 acts on the upper electrode member 3. As a result, the common electrode 9 only makes contact with the central portion or the apex of the mountain-shaped pressure-sensitive layer 33.

In FIG. 7, a medium force F2 acts on the upper electrode member 3. As a result, the common electrode 9 makes contact with the central portion of the mountain-shaped pressure-sensitive layer 33 and further the outer peripheral side of the mountain-shaped pressure-sensitive layer 33. In other words, the contact surface between the common electrode 9 and the mountain-shaped pressure-sensitive layer 33 is larger.

In FIG. 8, a large force F3 acts on the upper electrode member 3. As a result, the common electrode 9 makes further contact with the outer peripheral side of the mountain-shaped pressure-sensitive layer 33. In other words, the contact surface between the common electrode 9 and the mountain-shaped pressure-sensitive layer 33 is even larger.

The insulation film 7 and the common electrode 9 are preferably elastic. By making these components elastic, the common electrode 9 is more likely to react to the mountain-shaped pressure-sensitive layer 33 when pressure acts on the pressure sensor. In other words, when pressure is high, the common electrode 9 is more likely to make close contact with the mountain-shaped pressure-sensitive layer 33 until the outer peripheral side of the mountain-shaped pressure-sensitive layer 33 (the thin portion of the mountain-shaped pressure-sensitive layer 33). As a result, the difference in contact resistance with the mountain-shaped pressure-sensitive layer 33 increases, that is, the range for measuring pressure increases.

By making the insulation film 7 and the common electrode 9 elastic, the insulation film 7 and the common electrode 9 are more able to return to their original form when pressure is no longer applied. As a result, it is easier to conduct repeated measurement.

Generally speaking, deflection across a large area occurs when pressure is applied to the insulation film 7 and the common electrode 9. When this occurs, a concentrated load acts on a plurality of pressure-sensitive layers and electrodes that have small areas, and the insulation film 7 and the common electrode 9 are likely to crack or deform. However, in the present embodiment, the insulation film 7 and the common electrode 9 are elastic, and hence the common electrode 9 is less likely to crack or deform on the mountain-shaped pressure-sensitive layer 33. As a result, the pressure sensor 1 is more reliable.

When a soft, thin substrate is brought upward as described above, the area of contact does not change any further if the upper electrode 9 completely contacts the mountain-shaped pressure-sensitive layer 33 until the base of the mountain-shaped pressure-sensitive layer 33. Therefore, the pressure measurement range decreases, but the resolution of pressure increases because there is a large difference between areas of contact. The thickness and hardness of the substrate are appropriately selected according to the range in which measurement is to be performed.

Rates of change of resistance in relation to pressure are explained for the present embodiment, a Comparative Example 1, a Comparative Example 2, and a Comparative Example 3 with reference to FIG. 9. FIG. 9 is a graph showing the relationship between pressure and rate of change of electrical resistance in the pressure sensor.

In the present embodiment, a high rate of change, that is, high sensitivity is obtained in a low-pressure region. In addition, a predetermined rate of change of resistance, that is, pressure can be measured in a high-pressure region. The reasons for this are as follows.

The sensitized electrode 31 has a shape where, due to pressing force acting on the common electrode 9 toward the mountain-shaped pressure-sensitive layer 33, the distance between the sensitized electrode 31 and the outer edge of the contact surface at which the common electrode 9 and the mountain-shaped pressure-sensitive layer 33 make contact gradually becomes narrower when the contact surface expands outward from the central portion of the mountain-shaped pressure-sensitive layer 33 when viewed in plan. The distance H1 in FIG. 6, the distance H2 in FIG. 7 and the distance H3 in FIG. 8 clearly become narrower.

The distance H1 is, for example, 25 μm and the distance H3 is, for example, 10 μm. In the state illustrated in FIG. 8, the resistance value is lower compared to the states illustrated in FIGS. 6 and 7, and therefore the current value is higher compared to the states illustrated in FIGS. 6 and 7.

Because the sensitized electrode 31 expands outward from the central portion of the mountain-shaped pressure-sensitive layer 33 when viewed in plan, sensitivity of the pressure sensor is increased overall.

As illustrated in FIG. 8, for example, with the above-described configuration, the outer edge of the contact surface at which the common electrode 9 and the mountain-shaped pressure-sensitive layer 33 make contact is located further outward when a high pressure is applied as compared to when a low pressure is applied (for example, FIG. 7). Because the distance between the sensitized electrode 31 and the outer edge of the contact surface is shorter in this state, a short conduction path is secured between the common electrode 9 and the sensitized electrode 31. Therefore, even in high pressure ranges, sensitivity is sufficient and pressure can be accurately measured. In other words, in the pressure sensor 1, a wide pressure measurement range in which pressure can be accurately measured can be ensured.

In Comparative Example 1, the pressure sensor 1 has the same basic configuration as that in the present embodiment and includes the mountain-shaped pressure-sensitive layers. However, the separately disposed electrodes do not satisfy a condition that is satisfied by the sensitized electrodes of the present embodiment, that "the distance between the sensitized electrode and the outer edge of a contact surface at which the common electrode and the mountain-shaped pressure-sensitive layer make contact gradually becomes narrower when, due to pressing force being applied, the contact surface expands outward from the center portion of the mountain-shaped pressure-sensitive layer". For example, the diameter of each individual electrode is 20% or less than the diameter of the mountain-shaped pressure-sensitive layer and each individual electrode has a shape where the distance between the electrode and the outer edge of the contact surface at which the common electrode and the mountain-shaped pressure-sensitive layer make contact gradually becomes wider when, due to pressing force being applied, the contact surface expands outward from the center portion of the mountain-shaped pressure-sensitive layer. Therefore, in Comparative Example 1, sensitivity is higher overall. In addition, when a high pressure is applied, the rate of change of resistance approaches 0%, meaning that pressure cannot be measured.

In addition, because there is no sensitized action in Comparative Example 1, there is a problem in that the resistance value increases more than in the preset embodiment.

In Comparative Example 2, the basic configuration of the pressure sensor 1 is the same as that in the present embodiment in which each individual electrode expands until an outer peripheral portion of the pressure-sensitive layer, and the pressure-sensitive layer has a flat upper surface. Therefore, sensitivity reduces overall. When a high pressure is applied, the rate of change of resistance approaches 0%, meaning that pressure cannot be measured.

In Comparative Example 3, beta electrodes are disposed not in an active matrix but facing the common electrode. In addition, when a high pressure is applied, the rate of change of resistance approaches 0%, meaning that pressure cannot be measured.

In the present embodiment, the sensitized electrode 31 has a diameter that extends until the vicinity of the outer edge of a contact surface at which the common electrode 9 and the mountain-shaped pressure-sensitive layer 33 can make contact with each other with a largest area. In this case, the above-described effect can be achieved to the fullest extent. Even if pressure increases even further on the outer side of the outer edge of the contact surface, the common electrode 9 does not make contact with the mountain-shaped pressure-sensitive layer 33. Therefore, there is little effect even if the sensitized electrode 31 also extends further toward the outer side.

However, the sensitized electrode 31 need only have a diameter that is 30% or 50% or more the length of the diameter of the mountain-shaped pressure-sensitive layer 33.

Note that the planar shape of the sensitized electrode includes a circular shape and other shapes. Therefore, the term "diameter" herein refers to ends of the electrode in both directions when viewed in plan.

The diameter of the sensitized electrode 31 is shorter than the diameter of the mountain-shaped pressure-sensitive layer 33. By making the diameter of the sensitized electrode 31 shorter, the sensitized electrode 31 does not protrude further than the mountain-shaped pressure-sensitive layer 33, and hence the common electrode 9 and the sensitized electrode 31 are less likely to make contact with each other. In actuality, the sensitized electrode 31 is configured with manufacturing errors in mind, that is, to have a diameter that is no more than 98% or no more than 94% the diameter of the mountain-shaped pressure-sensitive layer 33. However, there are no problems during use even if the sensitized electrode 31 protrudes further than the mountain-shaped pressure-sensitive layer 33, provided that the sensitized electrode 31 does not make contact with the common electrode 9.

(4) Materials

The insulation films 7 and 15 can be made of an engineering plastic such as polycarbonate, polyamide or polyether ketone, or a resin film such as acrylic, polyethylene terephthalate or polybutylene terephthalate.

If the insulation film 7 is to be made elastic, urethane film, silicon or rubber can be used. The insulation films 7 and 15 are preferably made of a heat-resistant material because electrodes are formed on the insulation films 7 and 15 through printing and drying.

The common electrode 9 and the sensitized electrode 31 can be made of a metal oxide film such as tin oxide, indium oxide, antimony oxide, zinc oxide, cadmium oxide, or indium tin oxide (ITO), a composite film mainly composed of the above-mentioned metal oxides, or a metal film made of gold, silver, copper, tin, nickel, aluminum, or palladium. An elastic Ag paste, for example, is used if the common electrode 9 is to be made elastic.

The mountain-shaped pressure-sensitive layer 33 is made of, for example, a pressure-sensitive ink. The pressure-sensitive ink is a material that enables pressure to be detected through varying contact resistance between ink and an opposing electrode according to the amount of external force applied. A pressure-sensitive ink layer can be applied to another member through coating. The pressure-sensitive ink layer can be applied using a printing method such as screen printing, offset printing, gravure printing or flexographic printing, or through using a dispenser.

(5) Method for Manufacturing Pressure Sensor

A method for manufacturing the pressure sensor 1 is described with reference to FIGS. 10 to 19. FIGS. 10 to 19 are schematic cross-sectional diagrams for illustrating a method for manufacturing the pressure sensor.

First, each step in a method for manufacturing the lower electrode member 5 is described with reference to FIGS. 10 to 18.

Figure 10:
FIG. 10 is a schematic cross-sectional view for illustrating a method for manufacturing the pressure sensor.

As illustrated in FIG. 10, an electrode material 37 is formed on one surface of the insulation film 15 through sputtering.

Figure 11:
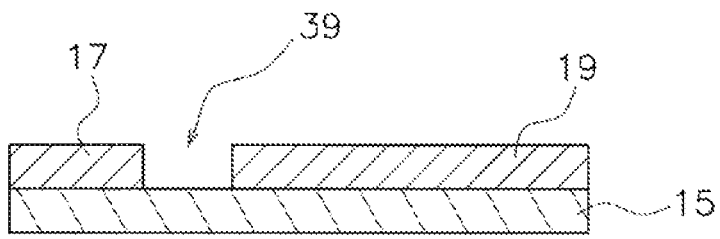
FIG. 11 is a schematic cross-sectional view for illustrating a method for manufacturing the pressure sensor.

As illustrated in FIG. 11, a film exposure portion 39 is formed by removing a portion of the electrode material 37 using, for example, photolithography. With this method, the source electrode 17 and the drain electrode 19 are formed. Note that the method for forming the source electrode 17 and the drain electrode 19 are not particularly limited.

Figure 12:
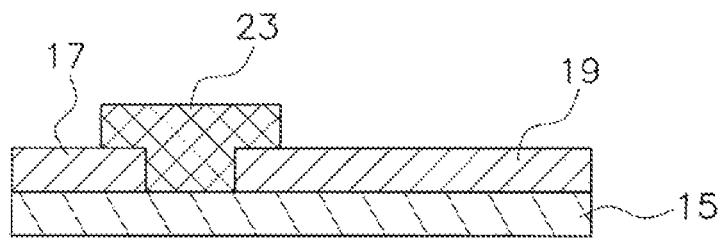
FIG. 12 is a schematic cross-sectional view for illustrating a method for manufacturing the pressure sensor.

As illustrated in FIG. 12, the organic semiconductor 23 is formed in the film exposure portion 39. The organic semiconductor 23 is formed using a well-known technology.

Figure 13:
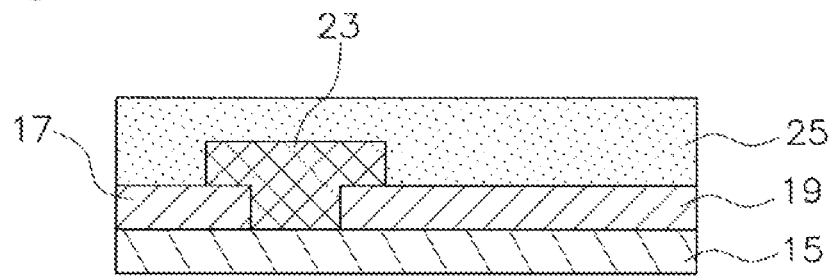
FIG. 13 is a schematic cross-sectional view for illustrating a method for manufacturing the pressure sensor.

As illustrated in FIG. 13, the first insulation film 25 is formed so as to cover the surface that is formed with the source electrode 17, the drain electrode 19 and the organic semiconductor 23.

Figure 14:
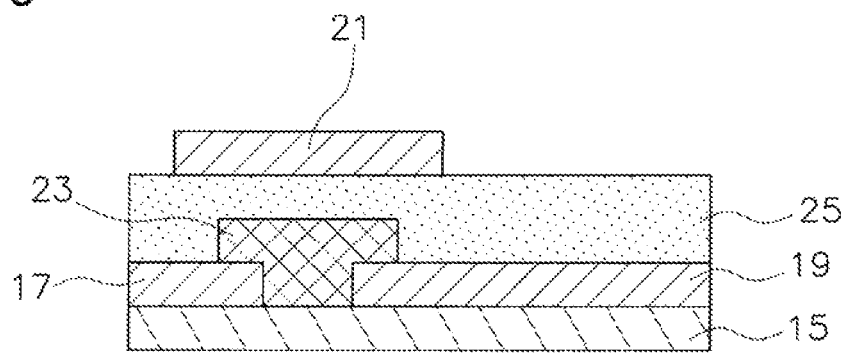
FIG. 14 is a schematic cross-sectional view for illustrating a method for manufacturing the pressure sensor.

As illustrated in FIG. 14, the gate electrode 21 is formed on the upper surface of the first insulation film 25 above the organic semiconductor 23. The gate electrode 21 is formed using a well-known technology.

Figure 15:
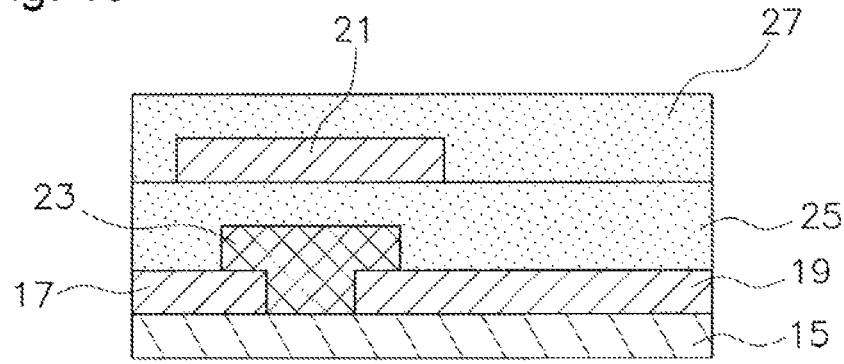
FIG. 15 is a schematic cross-sectional view for illustrating a method for manufacturing the pressure sensor.

As illustrated in FIG. 15, the second insulation film 27 is formed so as to entirely cover the first insulation film 25 formed with the gate electrode 21.

Figure 16:
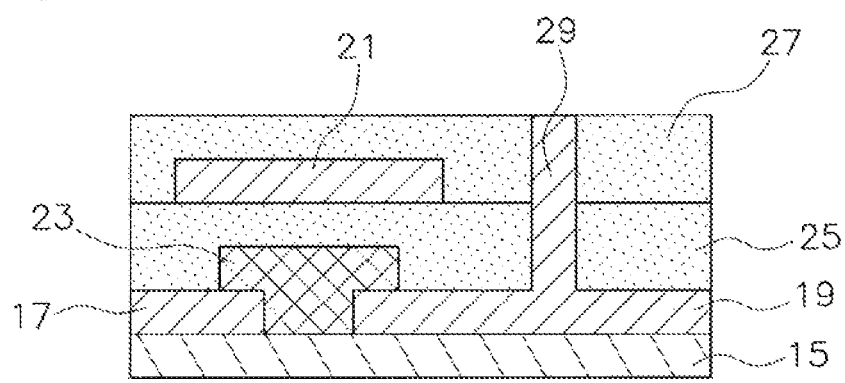
FIG. 16 is a schematic cross-sectional view for illustrating a method for manufacturing the pressure sensor.

As illustrated in FIG. 16, a through hole is formed through the first insulation film 25 and the second insulation film 27 using a laser. The through hole extends until the drain electrode 19 and is embedded with a conductive material to form the conductive portion 29.

Figure 17:
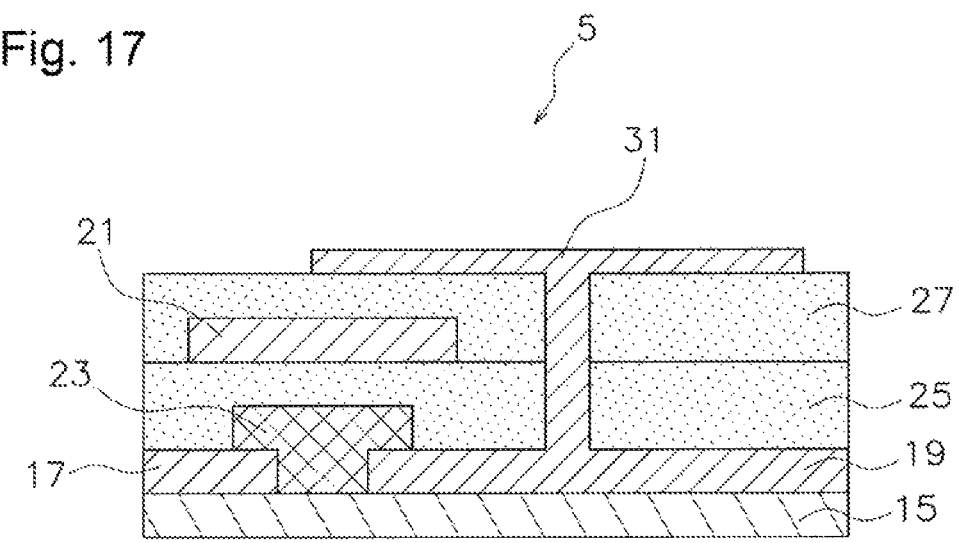
FIG. 17 is a schematic cross-sectional view for illustrating a method for manufacturing the pressure sensor.

As illustrated in FIG. 17, the sensitized electrode 31 is formed using a printing method and is connected to the TFT 30 via the conductive portion 29.

Figure 18:
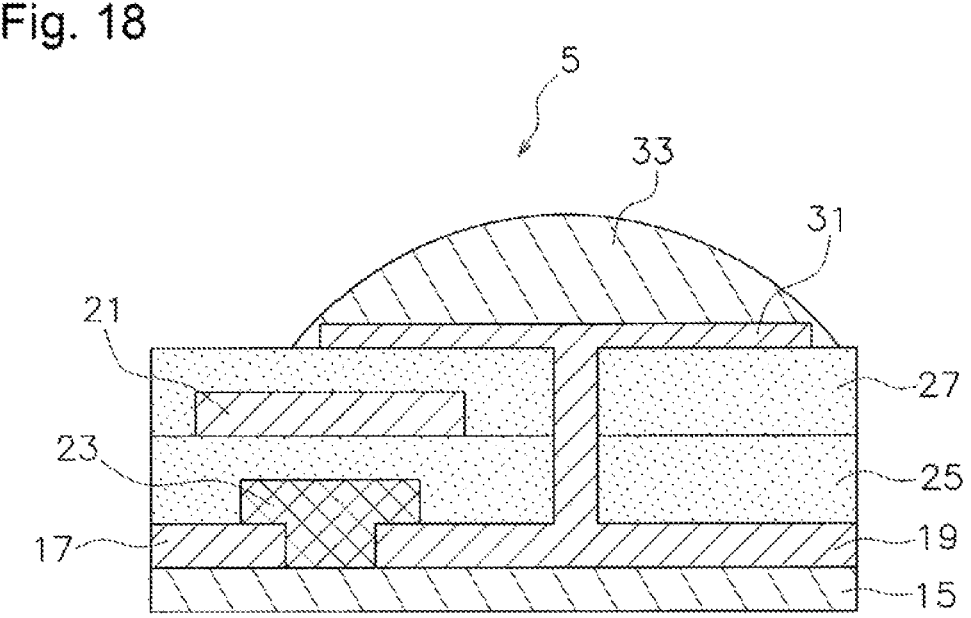
FIG. 18 is a schematic cross-sectional view for illustrating a method for manufacturing the pressure sensor.

As illustrated in FIG. 18, the mountain-shaped pressure-sensitive layer 33 is formed on the sensitized electrode 31 using a printing method.

Now, manufacturing of the upper electrode member 3 is described with reference to FIG. 19.

Figure 19:
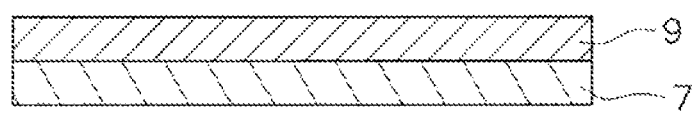
FIG. 19 is a schematic cross-sectional view for illustrating a method for manufacturing the pressure sensor.

As illustrated in FIG. 19, the common electrode 9 is formed on one surface of the insulation film 7 using a printing method. The material for the common electrode 9 can first be formed on the surface of the insulation film 7 through, for example, sputtering and then the common electrode 9 can be formed through photolithography.

Lastly, the upper electrode member 3 and the lower electrode member 5 are joined together using the frame-shaped frame spacer 13 (FIG. 2) that is made of an adhesive, to thereby complete the pressure sensor 1.

(6) Modification Example of Plan Layout for Sensitized Electrode and Pressure-Sensitive Layer In the above-described embodiment, the sensitized electrodes 31 and the mountain-shaped pressure-sensitive layers 33 are arranged in a matrix with completely matching columns and rows, but the sensitized electrodes 31 and the mountain-shaped pressure-sensitive layers 33 can be arranged in different matrix formations with broader meanings.

Figure 20:
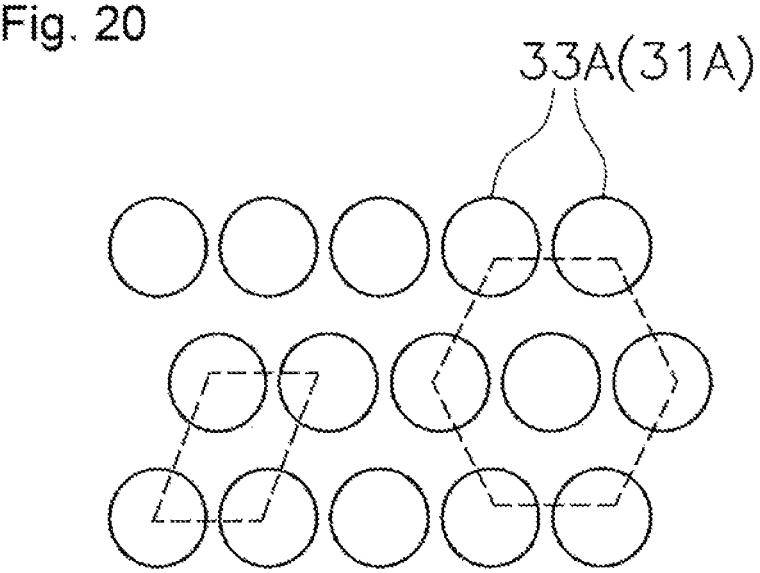
FIG. 20 is a schematic plan view for illustrating a modification example of the planar layout of the pressure-sensitive layer and the sensitized electrode.

In the example illustrated in FIG. 20, the plan layout for sensitized electrodes 31A and mountain-shaped pressure-sensitive layers 33A is a lattice of repeating polygons (for example, hexagons or parallelograms).

Figure 21:
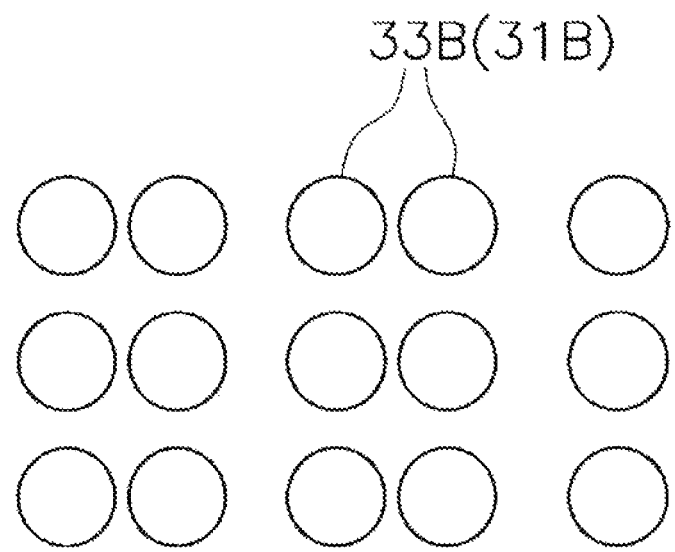
FIG. 21 is a schematic plan view for illustrating a modification example of the planar layout of the pressure-sensitive layer and the sensitized electrode.

In the example illustrated in FIG. 21, the sensitized electrodes 31B and the mountain-shaped pressure-sensitive layers 33B are not laid out evenly in plan and gaps are formed in a plurality of locations.

(7) Planar Shape of Sensitized Electrode and Pressure-Sensitive Layer

In the above-described embodiment, both the sensitized electrode 31 and the mountain-shaped pressure-sensitive layer 33 have a circular planar shape, but the planar shapes of these components are not limited to a circular shape.

Figure 22:
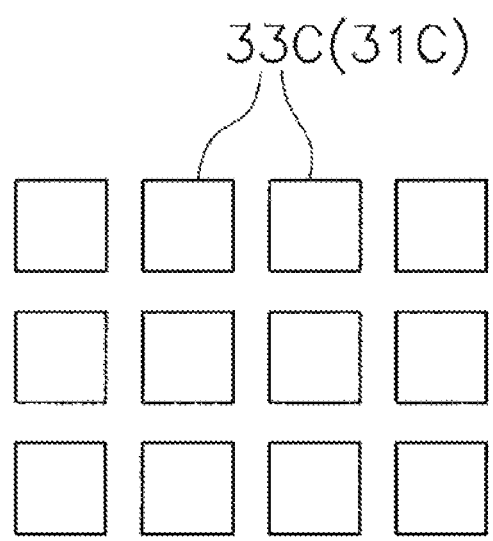
FIG. 22 is a schematic plan view for illustrating a modification example of the planar shapes of the pressure-sensitive layer and the sensitized electrode.

In the example illustrated in FIG. 22, a sensitized electrode 31C and a mountain-shaped pressure-sensitive layer 33C have square planar shapes. These planar shapes can also be triangular or in the shape of another polygon.

(8) Modification Example of Common Electrode

In the above-described embodiment, the common electrode 9 is in direct contact with the mountain-shaped pressure-sensitive layer 33, but the common electrode 9 can be in contact with the mountain-shaped pressure-sensitive layer 33 via another layer.

Figure 23:
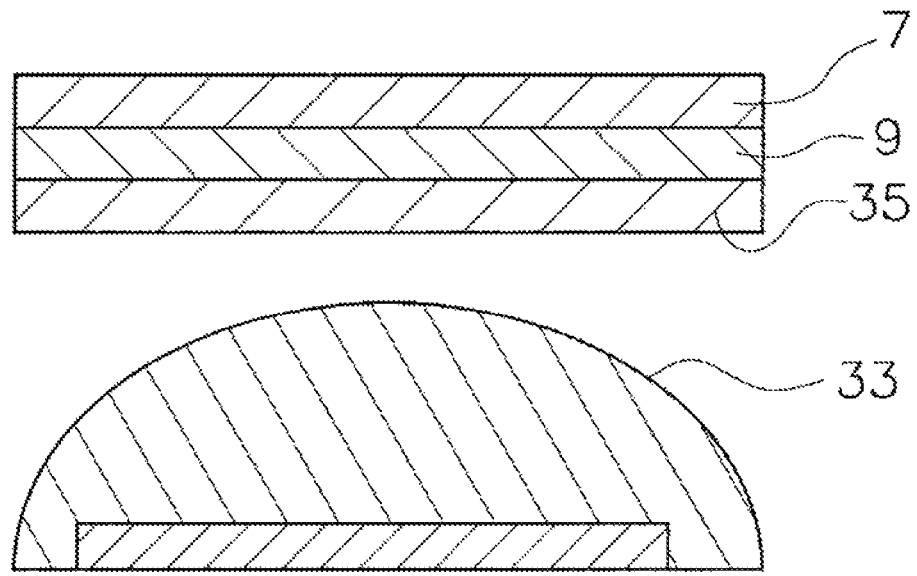
FIG. 23 is a schematic cross-sectional view for illustrating a modification example of the three-dimensional shapes of the pressure-sensitive layer and the sensitized electrode.

In the example illustrated in FIG. 23, a pressure-sensitive layer 35 is formed on the common electrode 9. In this case, the pressure-sensitive layer 35 makes contact with the mountain-shaped pressure-sensitive layer 33 when pressure acts on the pressure sensor.

(9) Modification Example of Side Surface Shape of Pressure-Sensitive Layer

In the above-described embodiment, the mountain-shaped pressure-sensitive layer 33 has a dome shape with a semi-circular side surface shape, but the shape of the mountain-shaped pressure-sensitive layer 33 is not particularly limited. However, the mountain-shaped pressure-sensitive layer 33 must have a predetermined height in order to make gradual contact with the common electrode 9 and obtain the desired effect. The mountain-shaped pressure-sensitive layer 33 must also have a predetermined (or lower) inclination angle in order to cause the common electrode to make contact with the side surface portion of the mountain-shaped pressure-sensitive layer 33 on the outer peripheral side of the mountain-shaped pressure-sensitive layer 33.

Figure 24:
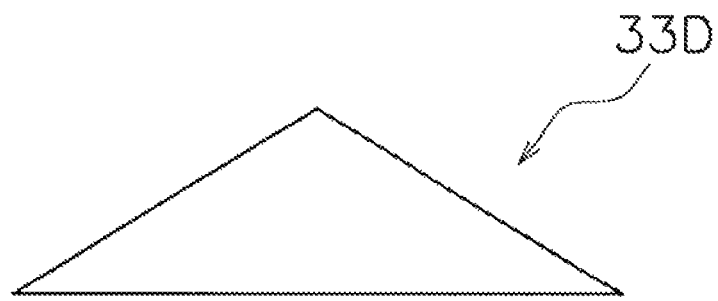
FIG. 24 is a schematic side view for illustrating a modification example of the three-dimensional shapes of the pressure-sensitive layer and the sensitized electrode.

In the example illustrated in FIG. 24, a mountain-shaped pressure-sensitive layer 33D has a conical shape with a triangular side surface shape.

Figure 25:
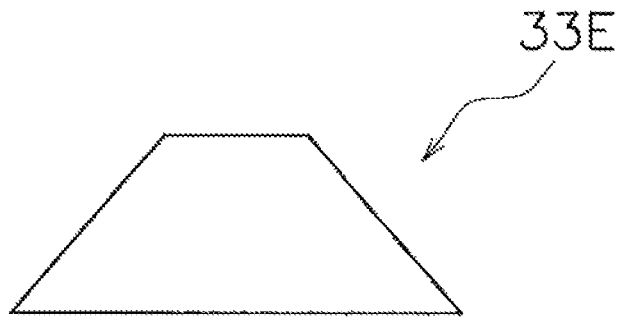
FIG. 25 is a schematic side view for illustrating a modification example of the three-dimensional shapes of the pressure-sensitive layer and the sensitized electrode.

In the example illustrated in FIG. 25, a mountain-shaped pressure-sensitive layer 33E has a conical shape with a trapezoid-shaped side surface shape. With a trapezoid-shaped side surface, the apex of the mountain-shaped pressure-sensitive layer must have an area that is sufficiently smaller than that of the inclined surface portion of the mountain-shaped pressure-sensitive layer.

The mountain-shaped pressure-sensitive layer can only have the above-described side surface shape on an upper portion of the mountain-shaped pressure-sensitive layer.

Figure 26:
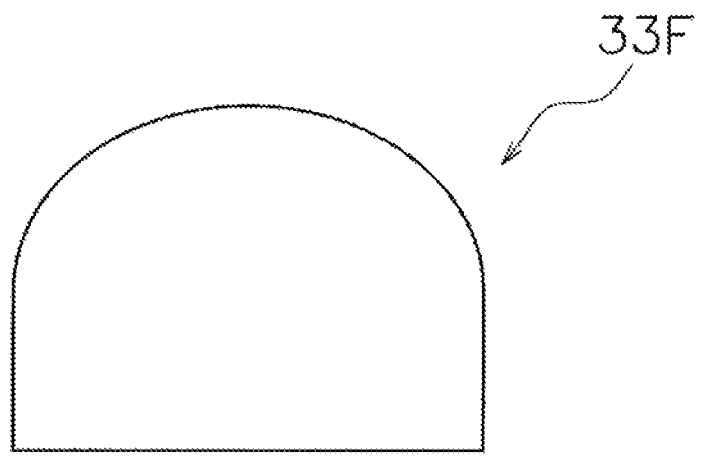
FIG. 26 is a schematic side view for illustrating a modification example of the three-dimensional shapes of the pressure-sensitive layer and the sensitized electrode.

In the example illustrated in FIG. 26, only the upper portion of a mountain-shaped pressure-sensitive layer 33F is formed into a dome shape.

Figure 27:
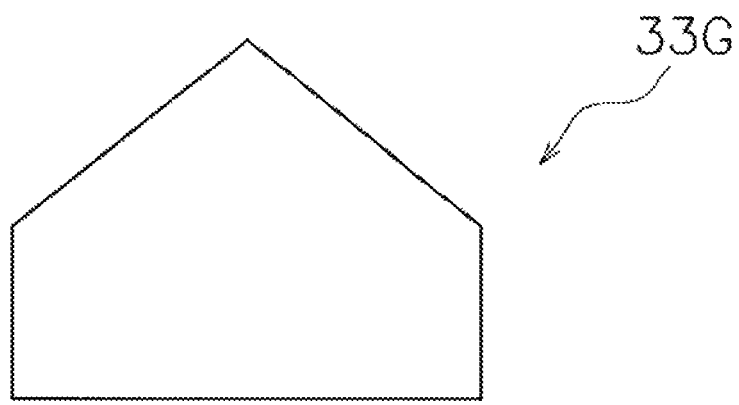
FIG. 27 is a schematic side view for illustrating a modification example of the three-dimensional shapes of the pressure-sensitive layer and the sensitized electrode.

In the example illustrated in FIG. 27, only the upper portion of a mountain-shaped pressure-sensitive layer 33G is formed into a cone shape.

Figure 28:
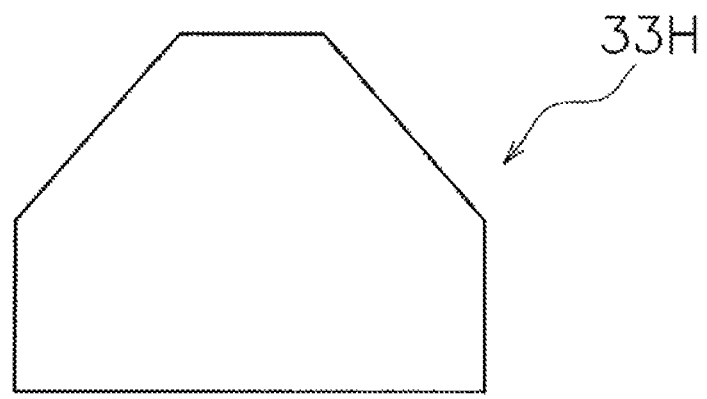
FIG. 28 is a schematic side view for illustrating a modification example of the three-dimensional shapes of the pressure-sensitive layer and the sensitized electrode.

In the example illustrated in FIG. 28, only the upper portion of a mountain-shaped pressure-sensitive layer 33H is formed into a frustum shape.

(10) Modification Example of Planar Shape of Sensitized Electrode

In the above-described embodiment, the planar shapes of the sensitized electrode and the mountain-shaped pressure-sensitive layer are mostly the same, but the planar shapes can be different. In particular, the shape of the sensitized electrode can be changed to control the rate of change of resistance.

More specifically, when resistance of the mountain-shaped pressure-sensitive layer 33 is too low compared to the resistance of the TFT 30, the area of the sensitized electrode 31 is reduced to adjust resistance (current) of the mountain-shaped pressure-sensitive layer 33.

Figure 29:
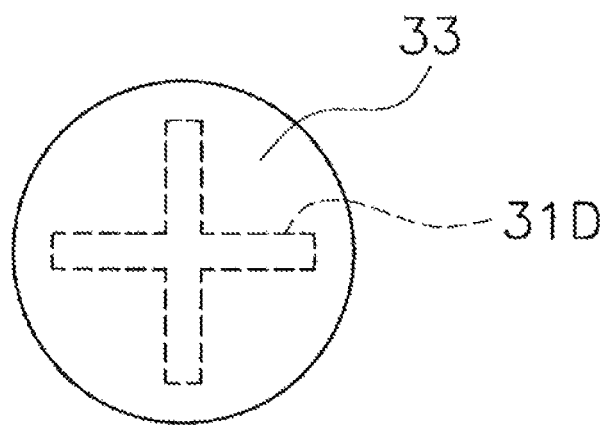
FIG. 29 is a schematic plan view of the sensitized electrode and the pressure-sensitive layer.

In the example illustrated in FIG. 29, the mountain-shaped pressure-sensitive layer 33 has a circular planar shape and a sensitized electrode 31D has a cross-shaped planar shape. Therefore, the short portion of the conduction path expands peripherally outward from the center of the sensitized electrode 31D along each protruding portion of the cross shape when pressure is applied.

Figure 30:
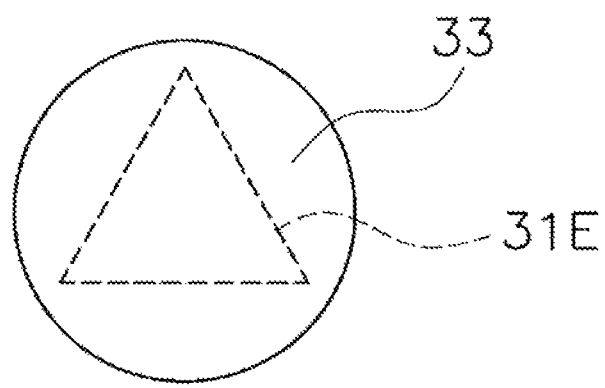
FIG. 30 is a schematic plan view of the sensitized electrode and the pressure-sensitive layer.

In the example illustrated in FIG. 30, the mountain-shaped pressure-sensitive layer 33 has a circular planar shape and a sensitized electrode 31E has a triangular planar shape. Therefore, the short portion of the conduction path expands peripherally outward from the center of the sensitized electrode 31E facing each angle of the triangle shape when pressure is applied.

Figure 31:
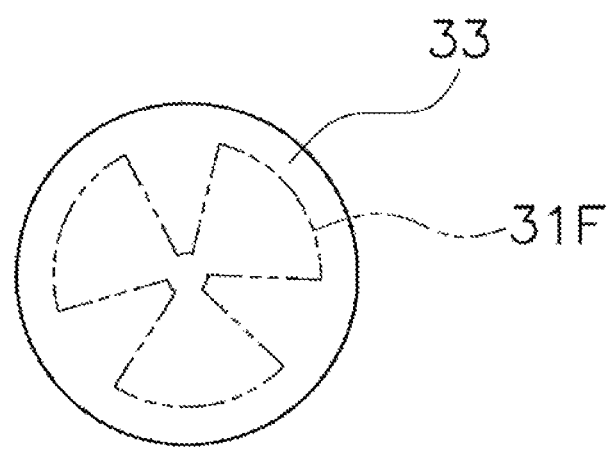
FIG. 31 is a schematic plan view of the sensitized electrode and the pressure-sensitive layer.

In the example illustrated in FIG. 31, the mountain-shaped pressure-sensitive layer 33 has a circular planar shape and a sensitized electrode 31F has a planar shape that is a combination of a plurality of fan shapes with a land at the center that connects the plurality of fan shapes. The land is connected to the TFT 30 through the conduction portion 29. Therefore, the short portion of the conduction path expands peripherally outward from the center of the sensitized electrode 31D along the fan shapes when pressure is applied.

In any of the above-described cases, the sensitized electrode 31D to 31F includes a sensitized portion that extends radially outward from the center of the sensitized electrode. The relationship between corresponding portions of the sensitized portion and the mountain-shaped pressure-sensitive layer is the same as described in the first embodiment. In other words, the sensitized portion of the sensitized electrode 31D to 31F is formed such that the conduction path between the common electrode 9 and the portion that extends radially outward from the center of the sensitized electrode becomes narrower as pressure increases.

(11) Other Modification Examples

In the above-described embodiment, the plurality of mountain-shaped pressure-sensitive layers 33 are electronically independent of each other, but the embodiment is not particularly limited thereto.

Figure 32:
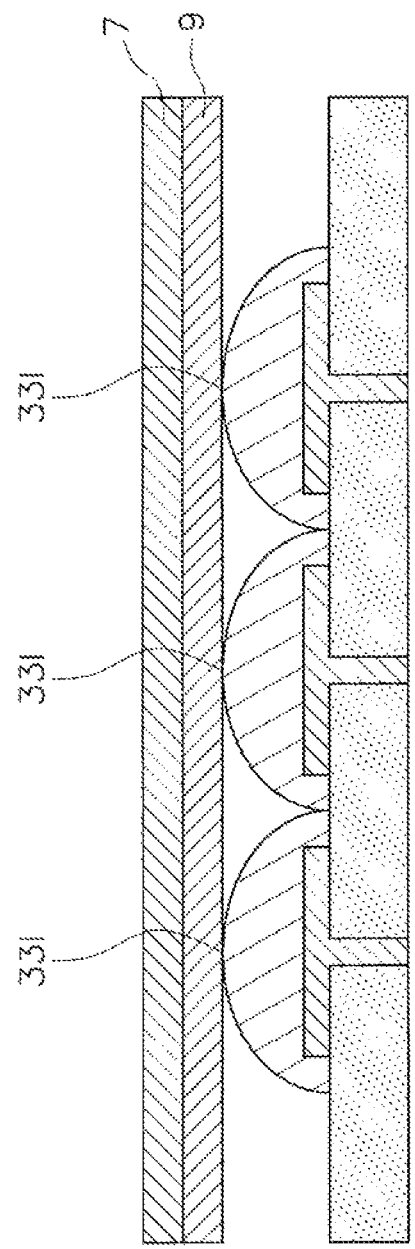
FIG. 32 is a partial schematic cross-sectional view of the pressure sensor.

In the example illustrated in FIG. 32, a plurality of mountain-shaped pressure-sensitive layers 331 are in contact with each other or continuous with each other.

In the above-described embodiment, the apexes of the plurality of mountain-shaped pressure-sensitive layers 33 are in the vicinity of the common electrode 9 or abut against the common electrode 9, but the embodiment is not limited thereto.

Figure 33:
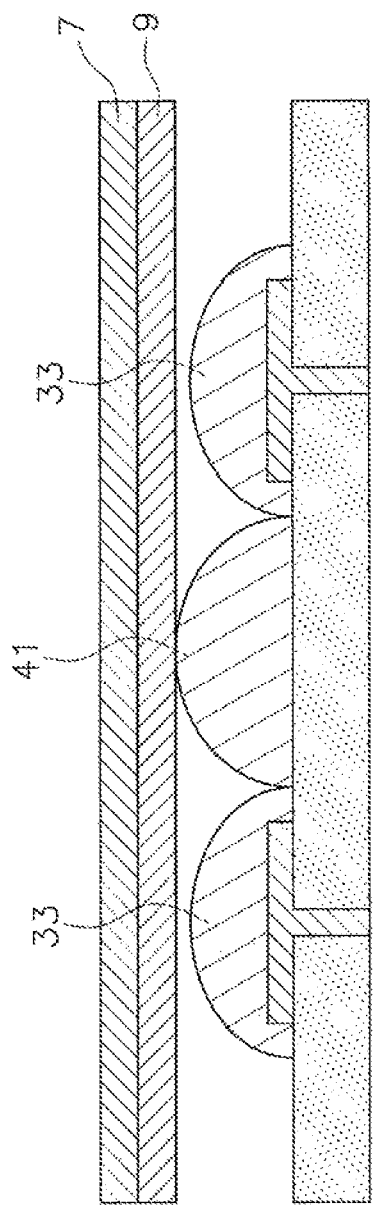
FIG. 33 is a partial schematic cross-sectional view of the pressure sensor.

In the example illustrated in FIG. 33, a dummy electrode or a spacer 41 is formed between mountain-shaped pressure-sensitive layers 33. The spacer 41 has a mountain shape similar to the mountain-shaped pressure-sensitive layer 33 and is taller than the mountain-shaped pressure-sensitive layer 33. Therefore, a gap can be reliably ensured between the common electrode 9 and the mountain-shaped pressure-sensitive layer 33 when no pressure is applied, and hence pressure acting on the mountain-shaped pressure-sensitive layer 33 can be zeroed. In FIG. 33, the spacer 41 is formed continuous from the mountain-shaped pressure-sensitive layer 33. Because the spacer 41 is mountain-shaped, space on peripheral upper sides of the pressure-sensitive layer 31 is relatively large and therefore the common electrode 9 is more likely to react to the mountain-shaped pressure-sensitive layer 33. However, the shape of the spacer is not limited to a mountain-shape and the upper surface of the spacer can be flat.

Figure 34:
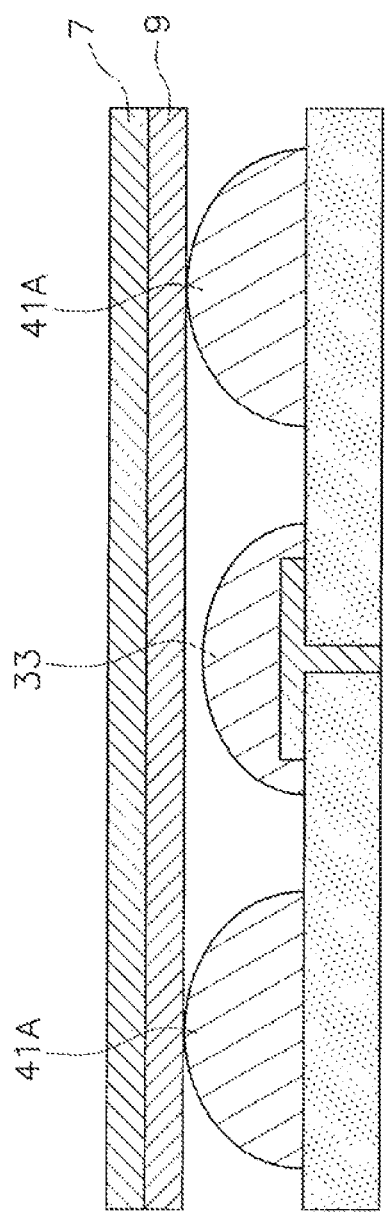
FIG. 34 is a partial schematic cross-sectional view of the pressure sensor.

In the example illustrated in FIG. 34, spacers 41 are formed separated from the mountain-shaped pressure-sensitive layer 33.

(12) Modification Example of Thin-Film Transistor

In the above-described embodiment, a thin-film transistor is disposed to correspond to each individual electrode, and the current of each thin-film transistor is detected. In other words, one thin-film transistor is connected to one sensitized electrode.

However, a plurality of thin-film transistors can be disposed for one sensitized electrode and the current of the plurality of thin-film transistors can be detected. More specifically, two or more adjacent thin-film transistors are connected to one sensitized electrode. With this configuration, the current value to be detected increases and circuit redundancy can be achieved.

A example in which a total of four thin-film transistors in the 2×2 pattern illustrated in FIG. 4 are disposed for one sensitized electrode is described. In this case, gate lines G1 and G2, source lines S1 and S2, and four drain electrodes are short-circuited and connected to one sensitized electrode via a through hole and a conduction portion.

The thin-film transistors can be combined in a plurality of different ways. For example, the pattern of combination can be 2×3, 3×2, 4×4, or 5×2. A plurality of combination patterns can exist for one pressure device.

2. Other Embodiments

A plurality of embodiments of the present disclosure have been described above, but the present disclosure is not limited to the above-described embodiments and can be changed in various ways without departing from the gist of the disclosure. In particular, the plurality of embodiments and modification examples described herein can be arbitrarily combined as necessary.

The present disclosure can be applied to any pressure sensor that includes a pressure-sensitive layer and a plurality of thin-film transistors that function as electrodes. In particular, the pressure sensor according to the present disclosure is suited to a touch screen as well as a large-area sheet sensor. More specifically, the pressure sensor according to the present disclosure can be applied to technology for measuring walking (for medical, sports and security applications) or technology for measuring bedsores.

REFERENCE SYMBOLS LIST

1: pressure sensor
3: upper electrode member
5: lower electrode member
7: insulation film
9: common electrode
13: frame spacer
15: insulation film
17: source electrode
19: drain electrode
21: gate electrode
23: organic semiconductor
25: first insulation film
27: second insulation film
29: conduction portion
30: thin-film transistor
31: sensitized electrode
33: mountain-shaped pressure-sensitive layer
35: pressure-sensitive layer

The invention claimed is:

1. A pressure sensor comprising:
a common electrode formed as a layer;
a plurality of sensitized electrodes arranged in a matrix opposing the common electrode;
a plurality of mountain-shaped pressure-sensitive layers respectively formed over the plurality of sensitized electrodes on a side close to the common electrode; and
a plurality of thin-film transistors disposed to correspond to the plurality of sensitized electrodes on sides of the sensitized electrodes opposite to the common electrode, where one or two or more adjacent thin-film transistors are connected to one sensitized electrode,
wherein a distance between the sensitized electrodes and an outer edge of a contact surface at which the common electrode and the mountain-shaped pressure-sensitive layers contact gradually becomes narrower when, due to pressing force applied to the common electrode toward the mountain-shaped pressure-sensitive layers and the sensitized electrodes, the contact surface expands outward from central portions of the mountain-shaped pressure-sensitive layers when viewed in plan.

2. The pressure sensor according to claim 1, wherein the sensitized electrode has a diameter that is 30% or more with respect to the diameter of the mountain-shaped pressure-sensitive layer.

3. The pressure sensor according to claim 2, wherein the sensitized electrode has a diameter that is 50% or more with respect to the diameter of the mountain-shaped pressure-sensitive layer.

4. The pressure sensor according to claim 3, wherein the sensitized electrode has a diameter that extends to a vicinity of an outer edge of a contact surface at which the common electrode and the mountain-shaped pressure-sensitive layer are configured to contact each other with a largest area.

5. The pressure sensor according to claim 1, wherein the sensitized electrode is completely covered by the mountain-shaped pressure-sensitive layer.

6. The pressure sensor according to claim 1, further comprising:
an insulating substrate disposed on the common electrode on a side opposite to the plurality of sensitized electrodes,
wherein the insulating substrate and the common electrode are elastic.

* * * * *